May 2, 1944.  J. S. DA COSTA  2,348,112
SELECTIVE AND AUTOMATIC LOADING AND UNLOADING DEVICE
Filed Aug. 3, 1942  2 Sheets-Sheet 1
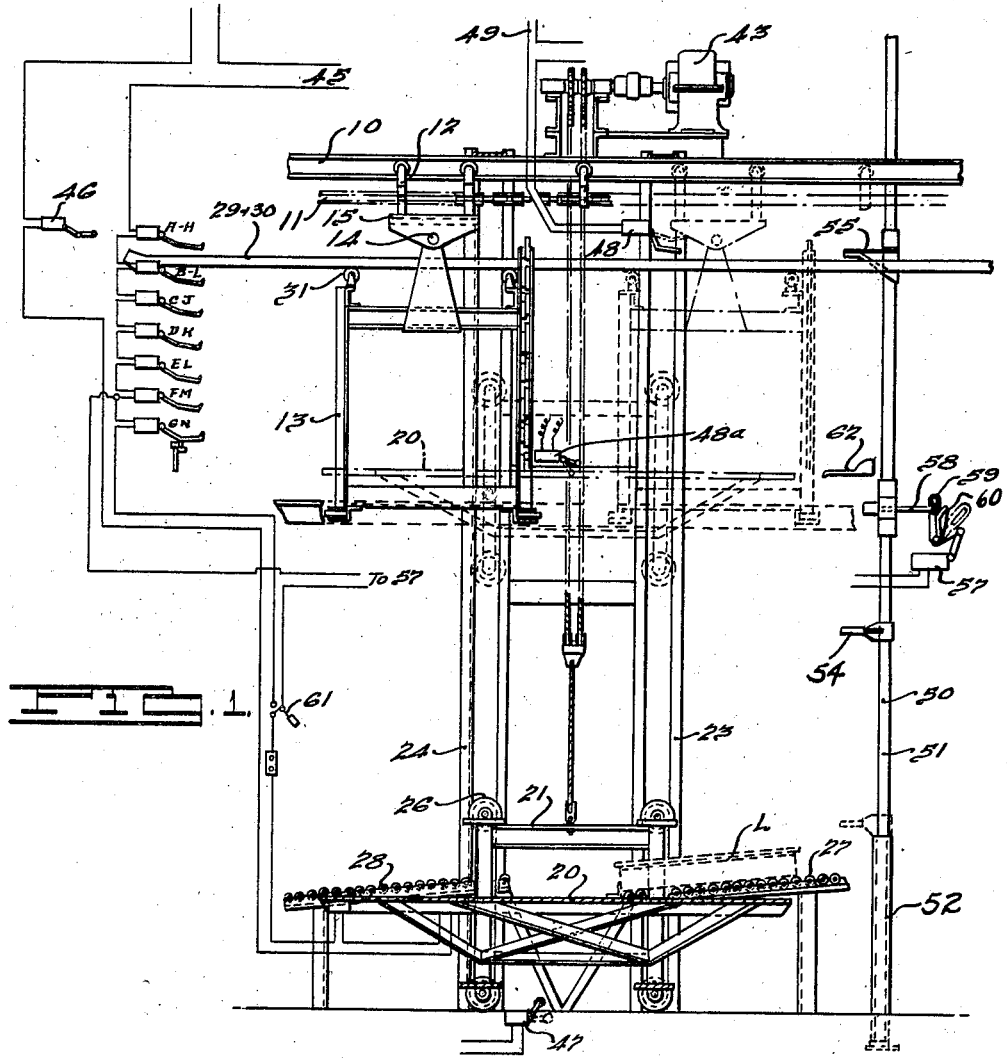
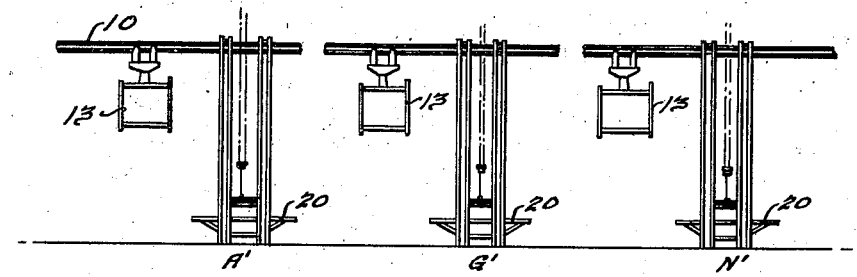
INVENTOR
James S. DaCosta.
BY Joseph Parley
ATTORNEY

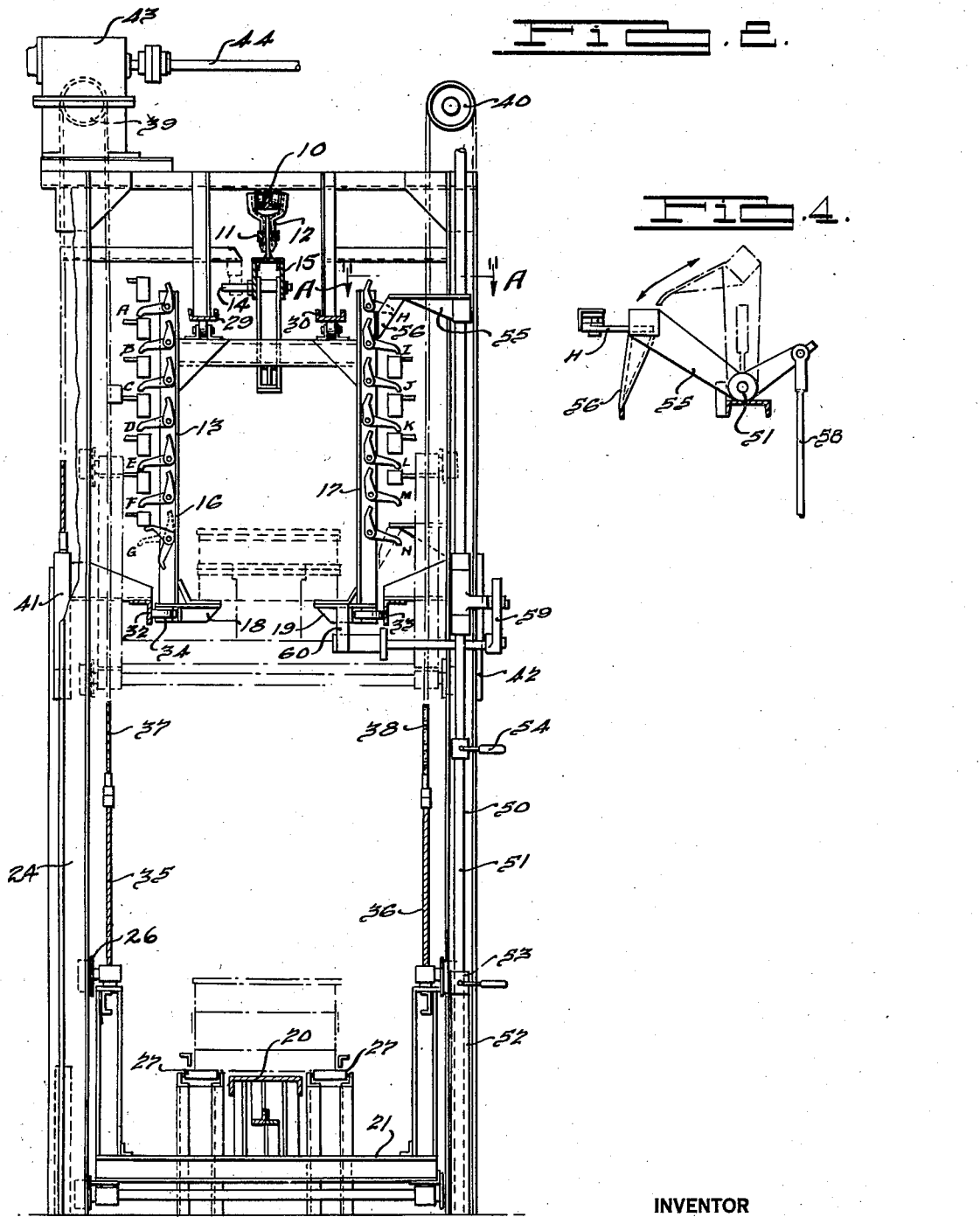

Patented May 2, 1944

2,348,112

UNITED STATES PATENT OFFICE 2,348,112

SELECTIVE AND AUTOMATIC LOADING AND UNLOADING DEVICE

James S. Da Costa, Merchantville, N. J., assignor to Palmer-Bee Company, Detroit, Mich., a corporation of Michigan Application August 3, 1942, Serial No. 453,332

7 Claims. (Cl. 198—38)

This invention relates to a selective and automatic loading and unloading device for conveyors.

The specific design here used for illustration is applied to an overhead trolley type of conveyor, capable of continuous travel through a plant from one department to another. With methods and apparatus previously used, a conveyor of this type requires considerable attention from operators for loading and unloading material and it would be both economical of equipment and personnel if loads could be automatically put on the conveyor at the same time as the load was removed therefrom. Furthermore when a load has been placed on the conveyor it would be a further important advantage if it could be automatically released at some pre-determined station farther on in the system.

It is therefore a primary object of the present invention to provide mechanism for unloading and loading a unit of a conveyor in a single sequence of operations and by the same transfer equipment.

It is a further object to supply a mechanism which when a load is placed on a conveyor at a given station, a setting can be made which will assure that such load will be automatically removed at a pre-determined station farther on in the conveyor travel.

The above and other objects of the invention will appear more fully from the following detailed description and by reference to the accompanying drawings forming a part hereof and wherein:

Fig. 1 is a vertical section through the center of one combined unloading and loading station, the section being taken longitudinally of the conveyor travel past the station and including a diagrammatic showing of the electrical control mechanism adjacent the station.

Fig. 2 is a vertical section also through the same combined unloading and loading station, the section being taken at right angles to the path of travel of the conveyor and at right angles to the view of Fig. 1.

Fig. 3 is a partially diagrammatic view indicating a plurality of conveyor stations, three of a group of stations being shown.

Fig. 4 is a sectional view taken on the line A—A of Fig. 2 and shows further details of the mechanism used to contact projecting members on the conveyor carrier to assure that a load, placed thereon will be removed at a pre-determined station in the subsequent travel of the carrier.

The combined unloading and loading stations, the details of one of which are shown in Figs. 1, 2 and 4, are intended to be placed at convenient stations located in various departments of a manufacturing plant served by a continuous endless chain type of conveyor. The overhead trolley type of conveyor is shown supported on an overhead track 10, the track 10 supporting a chain 11 through trolleys 12. The overall length of the conveyor may be several thousand feet and according to established practice is constructed in an endless loop so that the chain will make a repeated travel continuously around the loop, being driven at one or more stations during its travel. Suitable carriers are supported below the chain at spaced intervals for transporting the loads to be carried and in the installation here used for illustration, these comprise so-called shelf carriers 13. The distribution of these carriers and the number of them may be varied but for the purpose of illustrating a practical application, a carrier spacing of 32 feet has been considered advantageous and such a spacing would provide some 80 carriers in an endless chain system of over 2500 feet in length. One of the carriers 13 of the system is illustrated in the drawings and as shown in Figs. 1 and 2 is made up of rectangular frames supported at the top on a pivot pin 14 secured in bracket 15 carried by a pair of trolleys 12. Rectangular side frames 16, 17 extend downwardly as shown in Fig. 2 and have shelves 18, 19 secured at their lower ends. The shelves extend a short distance toward the center line of the carrier and are so located as to contact the edges of the load carried but leave a substantially open space centrally of the load. As shown in Fig. 2, the shelves extend longitudinally of the carrier and in the direction of travel of the conveyor. It is noted also that a substantial open space is provided above and between the shelves by the spacing of the rectangular side frames 16, 17.

For the purpose of automatic selection of the unloading station, each of the carriers 13 is also provided with a series of operating levers, the number of these levers required, corresponding with the number of stations in the system. For convenience in later description, these levers will now be designated as A to G on one side of the carrier and H to N on the other side of the carrier as shown in Fig. 2. As shown each of these levers is pivoted and can be swung from an inoperative to an operative position by contact with the projecting ends by mechanism later described. In Fig. 2 all levers are in the inoperative position except G, which is in the operative position.

As previously mentioned there are a plurality of loading and unloading stations distributed along the conveyor travel and in the specified example herein described, it is intended that there will be 14 such stations which are designated by the letters A' to N'. For instance as shown in Fig. 3, there will be a station A' and somewhere farther along in the system a station G' and station N' which have been selected for illustration in Fig. 3 for the purpose of later description. There are intervening stations not illustrated as shown by the broken track sections between the stations.

At each of the stations A' to N' a combined unloading and loading unit such as illustrated in Figs. 1 and 2 is provided. In essentials the unit comprises a load carrying platform 20 mounted for vertical reciprocation on a carriage 21 which is guided by tracks 23, 24 formed by vertical angle members at the four corners of the vertical frame which extends from the floor to a level adjacent the overhead track 10 of the conveyor. Vertical track sections 23, 24 are so constructed as to guide the flanged wheels 26 provided at the corners of the carrier 21. The platform 20 is of a length such as shown in Fig. 1 which will provide surface for lifting two loads, one of the loads being that carried by a carrier 13 coming into the station and the other being a new load to be deposited on the carrier. As shown by the dotted lines in Fig. 1 the platform 20 would support loads over surfaces covering substantially the length of the full line and dotted positions of the carrier 13. Inspection of Fig. 2 will show that the platform 20 is of a width such as will pass between the shelves 18, 19 of the carrier 13, thus supporting the loads centrally and lifting them above the shelf supports. It is apparent that at the dotted line position of the platform 20 shown in Fig. 1, the load on the solid line positioned carrier 13 will be lifted off and the carrier left free to travel on toward the right under the new load to be deposited which is supported on the right hand end of the platform 20.

Roller platforms 27 are located at each side and slightly higher than the platform 20 in its lower position (Fig. 2) and may be the end of a gravity type of conveyor for feeding new loads to the station and may be inclined as shown at the right in Fig. 1. Adjacent the other end of the platform 20 and also positioned at each side thereof are gravity roller conveyor sections 28 inclined in the direction to remove loads from the station.

For the purpose of providing a definite guide to steady the carriers 13 as they pass through the unit, the top guides 29, 30 (Fig. 2) also shown in the side view in Fig. 1 are provided to contact suitable roller members 31 on the top of the carrier while side guides 32, 33 are provided near the bottom of the carrier to become contacted by rollers 34 thus providing for lateral guiding of the carrier. Both the guides 29, 30 and 32, 33 extend a short distance away from each side of the unit and merely serve to guide the carrier during the passage through the unit.

Suitable cable connections 35, 36 to the carriage 21 are provided and may be secured to chains 37, 38 carried over sprockets 39, 40 at the top of the frame, and the chains 37, 38 traveling over the sprockets 39, 40 and terminating at counterweights 41, 42 secured at their depending ends. Both of the sprockets 39, 40 may be driven by suitable gear or other connections extending between the two shafts, gear box 43 being shown together with connecting shaft 44 extended to drive the opposite shaft 40, it being understood that the entire unit is driven by a reversible electric motor, not shown, connected to the gear box 43. Therefore by the operation of the motor connected with the gear box 43 in one direction or another, the platform 20 may be moved up or down in the frame.

The electrical circuit which starts the motor connected with the gear box 43 in a direction to raise the platform 20 is the so-called raising circuit 45 shown diagrammatically in Fig. 1, that is the circuit from point 45 to the motor is not shown but it is understood that it is connected to suitable starter units for operating the motor in a direction to start the platform 20 in an upward direction. For the purpose of controlling the raising circuit there are several switches in series in the raising circuit 45. The first of these is the circuit maker switch 46 which is actuated by contact with the projecting end of the pivot pin 14 as the carrier passes by the switch in its normal path of travel from left to right toward the station illustrated in Fig. 1 which for the purpose of this description is assumed to be station G'. Spaced to the right of the switch 46 there are a plurality of 14 switches labeled A to N, inclusive, corresponding to the number of stations in the system. All of these switches except the one for station G', the one for station now illustrated, are circuit breakers while the single switch G corresponding to the station which the carrier is approaching is a circuit maker. Therefore if the lever G on carrier 13 is thrown into operative position, as it is shown in Fig. 2, then the lever will contact the circuit maker switch at the same time that the projecting pivot pin 14 contacts the switch 46 and therefore when both of these switches are actuated, the raising circuit is closed by both of them. The raising circuit 45 is also carried to the underside to the gravity roller conveyor sections 28 (at the left in Fig. 1) where a switch is provided which is actuated by a weight on the rollers to disconnect the rollers when a load is held thereon, thus opening the circuit and making it impossible to raise the platform 20 if there is a load which would be picked up by the load carrying platform 20 from the outgoing side of the station, as such a result could not be desired. The switch 46 and the switches A to N, inclusive, are so positioned relative to the track and the carrier 13 and also in such relation with the definite rate of upward travel of the carriage 21, which is started on closing of these switches, that the platform 20 will reach its upward travel, just past the top of the shelves 18 and 19 and between them, when the carrier 13 is substantially in the position shown by the solid lines in Fig. 1. Assuming that the conveyor carrier 13 and the platform 20 move at the same speed a satisfactory timing would be accomplished if switch 46 and switches A to N were positioned to start the platform upward travel when the platform and carrier had the same distance to travel to reach the position shown at the upper left portion of Fig. 1. It is evident that such movement of the platform 20 will lift such a load as is carried across the shelves 18 and 19 away from them and to substantially the position shown by the dotted outline of the platform 20 in Fig. 1. In order to stop the upward travel of the platform 20 at the desired point shown by the dotted outline 20, a circuit breaker switch 47 for the raising circuit is provided as shown at the bottom of Fig. 1 and it is intended that the counterweight 42 when it reaches its downward travel will contact this circuit breaker and therefore break the raising circuit and stop the upward travel of the platform 20, the timing of this actuation being determined by the position of the counterweight 42 which, of course, moves downwardly when the carriage 21 moves upward. It will be evident that when this condition is reached upward travel of platform 20 has been stopped at the dotted line position 20 but the carrier 13 still continues to move toward the right as viewed in Fig. 1 but the load which it previously carried is lifted off the shelves 18 and 19. The platform 20 will remain in its upper position until the projecting end of the pin 14 contacts an arm actuating a switch 48, the position of the switch being such that the carrier 13 has time to travel to a position placing its load supporting shelves 18, 19 under a new load on the right hand end of the platform 20. The aforementioned switch 48 is connected with a so-called lowering circuit 49 which with approximate electrical connections actuates the motor driving the gear box 43 in a direction to move the carriage 21 and the platform 20 in a downward direction. From the relative positions of the switch arm on the switch 48 and the dotted line position of the parts in Fig. 1 it is evident that the downward movement at the platform 20 is started so that any load carried on the right hand end of the platform 20 would be deposited on the shelves 18 and 19 as the carriage 21 and the platform 20 move downwardly, since the carrier 13 is then in a position to receive such load. The downward travel of platform 20 then continues carrying the load removed from the carrier on the left hand end of the platform and leaving the carrier to proceed on its travel with the new load which has been deposited thereon from the right hand end of the platform. The downward travel of the carriage is stopped by actuation of an appropriate switch 48a which may be positioned to be contacted by counterweight 41 or other part moving with platform 20.

A lever tripping mechanism 50 is used to select the station at which a load put on would be unloaded. Such selection is accomplished by mechanism which places the desired lever of the group A to N on the carrier in operative position. The part of this mechanism which is used to operate the trip levers for stations H to N is shown in Fig. 2, the mechanism for setting levers A to G is not shown but is of similar construction and, of course, located on the opposite side of the station. The unit 50 has an upwardly projecting shaft 51 and a tube 52 in which the shaft 51 slides in a vertical direction. An appropriate locating means 53 and a handle 54 makes it possible to push the shaft 51 to a desired position upward or downward thus locating a trip lever 55 which carries a tripping dog 56. As shown in Fig. 4 it is also possible to rotate the shaft 51 in the directions shown to either put it into position to contact one of the trip levers H to N or to put it in an inoperative position shown in the dotted lines. In the position shown in Fig. 2 the tripping dog 56 is in position to push the lever H into operative position, it being assumed that the carrier 13 in that figure is moving out of the plane of the paper and will be pushed down by contact with the underside of the tripping dog 56 as the carrier moves under it. The carrier will then be set on leaving the station G to release its load at the next station H. This is true because at station H, there will be a similar set of switches such as those shown in Figure 1, however, in this case the switch which will be contacted by the projecting lever H will be a circuit maker and will therefore cause the platform at that station to raise and to take off the load. However, if the lever H were not in actuating position it would not contact the lever H at the H station and would therefore leave an open circuit which would not allow the platform at that station to raise although the switch 46 is always closed by a carrier passing a station but if its corresponding mate is not actuated, the circuit will not be made.

After the tripping dog 56 has contacted the lever on the carrier 13 for which it is set, it is important that it be swung out of the path of travel immediately as otherwise it would set the same lever on every carrier passing the station which is definitely not desired. A lever 60 is therefore set in the path of travel to be contacted by a member on the carrier 13, after the tripping dog 56 has performed its function of setting the desired operating lever. As shown in Figs. 1 and 2 the lever 60 is connected to actuate a lever and link 58 to swing the shaft 51 and lever 55 to an inoperative position as shown dotted on Fig. 4.

Circuit making switches such as 46, 48 and G are preferably of the type well known in the art which when once actuated to make the circuit are held by magnetic means in circuit closed condition until a circuit breaker switch such as 47, 48a or the circuit breakers A to F above mentioned are actuated to break the connection momentarily at some other point in the electrical circuit. Such breaking of the circuit will cause the magnetically held circuit making switch to be released and returned to its original condition ready for subsequent use.

In order to assure that the unloading and loading cycle can only be started when the tripping mechanism is set in operative position, a circuit maker switch 57 in the raising circuit is positioned to be actuated when the shaft 51 is set in operative position. Such result is accomplished by connecting the switch to be operated to the link and lever unit 58.

A projecting member or lever 62 is also positioned at a point near each station so that the lever for that station will be moved to an inoperative position after it has done its work of contacting one of the switches A to N. The lever 62 for the station G' is shown in Fig. 1 and merely comprises a member which contacts the projecting portion of the lever G and tips it back into an inoperative position.

It is sometimes desired that the platform 20 be raised to put a load upon an empty carrier, that is a carrier which has none of its actuating levers in operating position to contact one of the switches A to N. For this purpose a special switch 61 is provided which when closed will have the same effect as would the actuation of the switch corresponding to the switch G for the station shown.

As previously mentioned, the roller platforms 27 may be the terminal end of a roller conveyor, or, depending upon circumstances of the particular installation, loads may be placed on the platforms 27 manually. However, the roller platforms 27, as can be seen on reference to Fig. 2, are positioned at each side of and a little above the platform 20 when the platform is in its lowermost position and the platform is designed to hold a load L, such as that shown by dotted lines in Fig. 1, in position just above the lowermost position of the platform 20 as shown. It is, of course, evident that a load to be carried by this conveyor must be of the size and general shape which would make it possible to be supported near its edges by the shelves such as 18 and 19 of the carrier 13. It is also quite essential that there be a central portion of the load or package which can be supported centrally on a platform such as 20. Now let it be assumed that a carrier 13 approaches along the track 10 somewhat to the left of the switch 46 and let it also be assumed that the actuating lever G of this carrier is in operating position and the station which we are describing is the station G', the lever G having been put in operating position at a previous station where the load was put on. Therefore when the pin 14 and the operating lever G of the unit come in contact with circuit makers 46 and G, respectively, the result will be a closing of the circuit 45 and will result in the starting of the carriage 21 with the platform 20 in the upward direction. This movement will immediately pick up the load L on the right hand end of the platform 20, it being noted that the left hand end of the platform 20 is empty. Since the location of the switch 46 and G are so positioned relative to the distance and rate of travel of the vertically moving platform, the carrier 13 will come into position to have its load contacted by the empty end of the carrier 20 in a position just a little toward the left of the position shown in Fig. 1 and on the final upward movement of the platform 20, it will lift the load up away from the shelves 18 and 19 of the carrier 13 by contact with load in the open space between the shelves. It will be remembered that the downward travel of the counterweight 42 contacts a switch 47 which is a circuit breaker on the raising circuit and which will therefore cause the carrier to stop its upward movement. This will cause the load to be held in its upward position away from the shelves until the carrier moves with its shelves out from under the load. Subsequently the pin 14 at the top of the carrier will contact the circuit maker switch 48 on the lowering circuit which then causes the platform to start in the downward direction. It should be remembered, however, that prior to the starting of the downward movement of the platform the carrier shelves 18 and 19 have moved under the load which is supported on the right hand end of the platform 20, and therefore on downward movement of the platform the load L will be deposited on the shelf of the carrier and as the platform moves downwardly it will carry the load which it removed from the carrier on its left hand end while the load which it carried upward on the right hand end will be deposited on the shelves of the carrier 13 and will be carried away along the conveyor track. The continued downward travel of the platform will then deposit its load on the gravity roller conveyor sections 28 as it will move downward between and below them. The direction of the incline of the roller platforms is such that the load tends to move off toward the left hand end and may be picked up by appropriate gravity roller conveyors or other equipment. As the carrier 13 moves to the right with its new load it contacts the tripping dog 56 which has been previously set to the pre-determined position to set the actuating lever for a station to which it is desired to have the load removed. In Fig. 2 this tripping dog 56 is shown as set to position the lever for station H and therefore assuming that the illustrated station is G it has been therefore pre-determined that the load will be taken off at the next station. Such result will be accomplished in the same manner as has just been described for station G as at station H the switch H will be a circuit maker and all of the remaining letter designated switches will be circuit breakers. As the carrier 13 moves towards the right it will contact the lever 60 and by actuation of the lever 59 and link 58 the tripping dog unit will be turned into an inoperative position.

Although a mechanism has been described by reference to a specific installation found practical for actual use, it is understood that various changes and modifications may be made without departing from the fundamental principles herein disclosed and such changes are contemplated within the scope of the following claims.

I claim:

1. In a combined unloading and loading mechanism for operation in conjunction with a continuously moving conveyor, a platform mounted for reciprocation upward to and downwardly from said conveyor, said platform having a portion for lifting a load from said conveyor without interruption of continuous movement of said conveyor, a second portion of said platform spaced horizontally from and in alignment with said first mentioned platform portion adapted to carry a load in alignment to be picked up by subsequent continuous movement of said conveyor.

2. In a mechanism for unloading and loading the carriers of a continuously moving conveyor, a vertically movable transfer platform having a length in the line of travel of the conveyor providing a lifting surface sufficient to contact a load and to hold it supported upward from said carrier to allow said carrier to move in its continuous travel without said load and a second lifting surface portion of said platform spaced horizontally from said first mentioned lifting surface to hold a second load in alignment to be picked up by subsequent continuous travel of said conveyor.

3. In an unloading and loading conveyor combination, carriers supported for movement with said conveyor, side frames projecting downwardly on said carriers, shelves projecting from said side frames toward the center of said carrier and leaving an open space therebetween, a platform having a width less than the distance between said projecting shelves and a length greater than the said carrier and providing horizontally spaced adjacent load supporting portions substantially aligned in the path of travel of said carrier, mechanism for raising said platform under said carrier to lift a load from said carrier onto one of said load supporting portions during movement of said carrier and to support such load above said shelves whereby said carrier in its path of movement will leave said load on said platform and move under a new load supported on the adjacent load supporting portion of said platform, further mechanism for moving said platform downwardly thereby to deposit said new load on said carrier.

4. In an unloading and loading device for removing a load and depositing a new load on a continuously moving conveyor, carriers at spaced intervals on said conveyor, shelf members on each of said carriers supporting a load by contacting edges of said load but leaving an open space centrally of said load, a platform having a width such as to contact the central portion of said load and of a length such as to provide a space at one end to receive a load from one of said carriers and a space at the other end to carry a new load to be placed on said carrier, mechanism for moving said platform under said carrier to lift said load upwardly from said shelf members during continuous movement of said carrier whereby said carrier is allowed to move from under said load to a position under said new load carried at the opposite end of said platform, and further mechanism for moving said platform downwardly thereby depositing said new load on said carrier and on subsequent downward movement of said platform to carry said first mentioned load downwardly therewith.

5. In a combined loading and unloading mechanism for a conveyor, carriers spaced at intervals on said conveyor, a vertically reciprocating platform adapted to lift a load from a carrier of said conveyor and to hold a second load in the path of travel of said carrier to be deposited on said carrier during continuous movement thereof, control mechanism for controlling said vertical reciprocating movement of said platform in timed relation with the movement of said carriers under said loads.

6. In a loading and unloading device for removing a load from and depositing a load on a continuously moving conveyor having spaced carriers, load supporting portions on each carrier positioned adjacent the edges of said load, a platform having space provided to hold said load to be removed and said load to be deposited centrally of said loads in alignment relative to the path of movement of said carriers, mechanism for moving said platform toward and from said path of movement of said carriers in timed relation to said carrier movement whereby said platform will contact load carried by a carrier and to be removed therefrom and hold such load above said load supporting portions of said carrier until said carrier moves in its continuous travel under said load to be deposited, and further mechanism causing downward movement of said platform to deposit said load when said carrier is moved into position thereunder and to carry said load to be removed downwardly with said platform.

7. In an unloading and loading mechanism for operation with a continuously moving conveyor having spaced carriers, said spaced carriers having portions thereon to support a load adjacent the edges thereof, a platform movable toward and from said conveyor and positioned to lift the load by contact with the central portion thereof thereby lifting said load from the edge supporting portions of said carrier, said platform having load carrying portions adapted to support a load to be removed and a load to be deposited in alignment in the direction of travel of said conveyor, electrical power mechanism for lifting said platform to contact said load to be removed by holding said load above said edge supporting portions of said carrier until said carrier moves out from under said load and under the said load to be deposited, a raising circuit controlling said power means to cause upward movement of said platform, a switch for closing said raising circuit operated by contact with said carrier whereby said platform is started in vertical movement to contact said carrier to lift a load therefrom, further switch means to stop said vertical movement when said load is lifted from said carrier, additional switch means operated by contact with said carrier to start lowering of said platform when said carrier has moved from under said load and into position to pick up a new load from opposite side of said platform.

JAMES S. DA COSTA.